(12) United States Patent
Qi et al.

(10) Patent No.: US 8,305,974 B2
(45) Date of Patent: Nov. 6, 2012

(54) METHOD, APPARATUS AND COMPUTER PROGRAM FOR PERMUTATION AND SUBCHANNELIZATION

(75) Inventors: Xin Qi, Beijing (CN); Chao Wei, Beijing (CN); Shaohua Li, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 777 days.

(21) Appl. No.: 12/383,704

(22) Filed: Mar. 26, 2009

(65) Prior Publication Data

US 2009/0257382 A1    Oct. 15, 2009

Related U.S. Application Data

(60) Provisional application No. 61/123,723, filed on Apr. 9, 2008, provisional application No. 61/123,599, filed on Apr. 9, 2008.

(51) Int. Cl.
 *H04W 4/00* (2009.01)
 *H04W 72/00* (2009.01)
 *H04B 7/00* (2006.01)
(52) U.S. Cl. ......... 370/329; 455/450; 455/464; 455/509
(58) Field of Classification Search .................... 370/329
 See application file for complete search history.

(56) References Cited

U.S. PATENT DOCUMENTS

| | | | | |
|---|---|---|---|---|
| 7,224,741 | B1 | 5/2007 | Hadad | 375/260 |
| 7,729,377 | B2 * | 6/2010 | Seo et al. | 370/468 |
| 8,169,928 | B2 * | 5/2012 | Iwamura et al. | 370/252 |
| 2007/0242636 | A1 * | 10/2007 | Kashima et al. | 370/329 |
| 2008/0187005 | A1 * | 8/2008 | Chauviere et al. | 370/480 |
| 2009/0060081 | A1 * | 3/2009 | Zhang et al. | 375/267 |
| 2010/0118998 | A1 * | 5/2010 | Baker et al. | 375/260 |

OTHER PUBLICATIONS

"IEEE 802.16m System Requirements", IEEE 802.16 Broadband Wireless Access Working Group, IEEE 802.16m-07/002r4, Oct. 19, 2007, 26 pgs.
"Symbol structure design for 802.16m—resource blocks and pilots", IEE 802.16 Broadband Wireless Access Working Group, IEEE C802.16m-08/121r1, Mar. 11, 2008, 6 pgs.
"Design of Resource Allocation Unit Structure for IEEE 802.16m", Taeyoung Kim et al., IEEE C802.16m-08/188r3, Mar. 10, 2008, 19 pgs.
"Part 16: Air Interface for Broadband Wireless Access Systems", IEEE P802.16Rev2/D3, Feb. 2008, 14 pgs.
"Simulation Results for Several of the Proposed Pilot Format Designs in IEEE 802.16m", Fred Vook et al., IEEE C802.16m-08/253, Mar. 19, 2008, 29 pgs.

* cited by examiner

*Primary Examiner* — Guang Li
(74) *Attorney, Agent, or Firm* — Harrington & Smith (57) ABSTRACT

M physical resource blocks PRBs are allocated for localized resource allocation LRA and N−M PRBs are allocated for distributed resource allocation DRA. Each PRB has U subcarriers. Subcarriers of the N PRBs are permuted to result in N subchannels. Serially for each $m^{th}$ one of the M PRBs allocated for LRA, the subcarriers for an $m^{th}$ one of the M PRBs allocated for LRA are punctured from the permuted subchannels. After puncturing, subcarriers of one of the subchannels are filled with subcarriers of all other subchannels which were punctured in the $m^{th}$ one of the M PRBs. The result after puncturing and filling for all M PRBs allocated for LRA is N−M PRBs each having U subcarriers and M PRBs each having U subcarriers. Then there is a wireless communication using at least one of a LRA on the resulting M PRBs or a DRA on the resulting N−M PRBs.

20 Claims, 5 Drawing Sheets

FIG.1

|   | n=1 | n=2 | n=3 | n=4 | n=5 | n=6 |
|---|---|---|---|---|---|---|
| FIG.2A | S-CH 1 / S-CH 2 / S-CH 3 | S-CH 4 / S-CH 5 / S-CH 6 | S-CH 6 / S-CH 1 / S-CH 2 | S-CH 3 / S-CH 4 / S-CH 5 | S-CH 5 / S-CH 6 / S-CH 1 | S-CH 2 / S-CH 3 / S-CH 4 |
| FIG.2B | S-CH 1 / S-CH 2 / S-CH 3 | S-CH 4 / S-CH 5 / S-CH 6 | ~~S-CH 6 / S-CH 1 / S-CH 2~~ | S-CH 3 / S-CH 4 / S-CH 5 | S-CH 5 / S-CH 6 / S-CH 1 | S-CH 2 / S-CH 3 / S-CH 4 |
| FIG.2C | S-CH 1 / S-CH 2 / S-CH 3 | S-CH 4 / S-CH 5 / S-CH 1 | (empty) | S-CH 3 / S-CH 4 / S-CH 5 | S-CH 5 / S-CH 2 / S-CH 1 | S-CH 2 / S-CH 3 / S-CH 4 |

FIG.3

METHOD, APPARATUS AND COMPUTER PROGRAM FOR PERMUTATION AND SUBCHANNELIZATION

CROSS REFERENCE TO RELATED APPLICATIONS

This patent application claims priority under 35 U.S.C. §119(e) from U.S. Provisional Patent Application Nos. 61/123,723 and 61/123,599, both of which were filed on Apr. 9, 2008 and both of which are incorporated by reference herein in their entirety, including exhibits.

TECHNICAL FIELD

The teachings herein relate generally to wireless networks that employ the concept of channel reuse, and though not limited thereto these teachings are specifically advantageous for WiMAX in which physical resource blocks are partitioned into different groups with different reuse factors, and in each group DRA and LRA are done in a FDM manner.

BACKGROUND

The following abbreviations and terms are herewith defined:
AMC adaptive modulation and coding
BS base station (e.g., network access node)
DL downlink
DRA distributed resource allocation
FDM frequency division multiplex
FUSC full usage of subchannels
IEEE institute of electrical and electronics engineers, Inc.
IMT international mobile telecommunications
LRA localized resource allocation
OFDM orthogonal frequency division multiplex
OFDMA orthogonal frequency division multiple access
PHY physical-layer
PUSC partial usage of subchannels
RB resource block
STBC space-time block coding
SFBC space-frequency block coding
SM spatial multiplexing
TG task group
UE user equipment (e.g., mobile station MS or subscriber station SS)
WiMAX worldwide interoperability for microwave access
IEEE 802.16 working group has established a new task group (TG), 802.16 TGm, to amend 802.16 specifications. See for example IEEE 802.16Rev2/D3, "IEEE draft standard for Local and Metropolitan Area Networks—Part 16: Air interface for fixed Broadband Wireless Access systems", February 2008, hereby incorporated by reference. The 802.16m amendment targets at providing an advanced air interface to meet the IMT-Advanced requirement, as seen at "IEEE 802.16m System Requirements" (document IEEE 802.16m-07/002r4), attached as Exhibit A to incorporated U.S. Provisional Patent Application No. 61/123,723.

During an IEEE 802.16m meeting held in Orlando, Fla. during March, 2008, a high-level subchannelization procedure has been proposed to support the concept of fractional frequency reuse. See for example "Symbol Structure Design for 802.16m—Resource Blocks and Pilots (document IEEE C802.16m-08/121r1) and "Design of Resource Allocation Unit Structure for IEEE 802.16" (document IEEE C802.16m-08/188r3), attached as respective Exhibits B and C to incorporated U.S. Provisional Patent Application No. 61/123,723. This subchannelization procedure is summarized generally as follows:

PHY resource blocks (RB) of the overall bandwidth are firstly permuted and partitioned to frequency reuse groups. Each group contains a specific set of RBs (e.g., the whole bandwidth is partitioned into 3 frequency reuse groups, with the reuse factors equal to 1, 2 and 3 respectively.)

Within each frequency reuse group, the localized resource allocation (LRA) and distributed resource allocation (DRA) are done in a FDM manner. That is, some PHY RBs are used for LRA, and the others are permuted and then used for DRA.

This high-level concept is much more flexible than subchannelization under the IEEE 802.16e standard. In 802.16e, FUSC/PUSC/AMC zones could only be defined in a TDM manner, i.e., a number of sequential OFDMA symbols is either used for DRA (i.e. FUSC/PUSC) or used for LRA (i.e. AMC). The FDM manner is seen to have a natural advantage of finer granularity than the TDM manner, which is intended to result in higher efficiency in terms of resource utilization.

Besides the frequency domain diversity, the FUSC/PUSC subchannelization of the 802.16e standard has the favorable property of inter-cell/sector interference averaging, which is primarily gained by doing permutation. After permutation, the number of "subcarrier hits" between any subchannels in different cells or sectors is minimized, so that the interference between subchannels in different (adjacent) cells or sectors is minimized. A single "subcarrier hit" means that the two subchannels in two different cells/sectors contain one same physical subcarrier. In other words, it means an inter-cell/sector subcarrier collision.

There is a problem on how to flexibly do LRA and DRA within one frequency reuse group without losing the above benefit of the inter-cell/sector interference averaging. It is noted that in 802.16e, this problem does not exist because LRA and DRA are done in a TDM manner. Consider a straightforward subchannelization method. First, a number of PHY RBs are selected for LRA based on channel state information. The other PHY RBs are left for DRA. Second, permutation (similar to the FUSC/PUSC permutation done in 802.16e) is done within the DRA PHY RBs to get the subchannels for DRA. The subcarriers in these subchannels are spread over all the DRA PHY RBs.

The above generalized approach leads to several drawbacks:

To do the LRA and DRA flexibly, the ratio between the number of LRA RBs and the number of DRA RBs should be flexible, which means that the number of DRA RBs should be variable. This needs a very large number of specific permutation sequences of different lengths, because the length of a permutation sequence should be equal to the number of DRA subchannels (at least according to the permutation scheme in 802.16e). Naturally, the number of DRA subchannels is determined by the number of PHY RBs for DRA. This very large number of possible permutation sequences will complicate implementation of a system under IEEE 802.16m.

A more serious problem arises for interference concerns. Even if there are many permutation sequences of different lengths, the low number of subcarrier hits between different cells/sectors in 802.16 cannot be kept. In one frequency reuse group, the set of PHY RBs selected for LRA is different among different cells/sectors due to the different channel states in that sector. Thereafter, the set of PHY RBs selected for DRA are different among different (adjacent) cells/sectors, and so the benefit of permutation is foregone.

Note that in 802.16e, the permutation is designed based on specific sequences, like a Reed-Solomon code. One beneficial property of such a sequence is that the sequence is still a Reed-Solomon code after being cyclically shifted or being modulo-added with some fixed number. Another positive property is that any different pair of Reed-Solomon codes has the maximum possible Hamming distance between them. Therefore, when the PHY resources selected for DRA are the same among different cells/sectors, by using the permutation, subchannels from different cells/sectors will have a very small number of subcarrier hits. U.S. Pat. No. 7,224,741 provides a more detailed explanation for the Reed-Solomon code advantage in this regard. But as noted above, when the PHY RBs selected for DRA are different among different cells/sectors, the interference reducing properties of the permutation cannot be sustained.

SUMMARY

In accordance with one exemplary aspect of the invention there is a method that comprises: determining that M physical resource blocks are allocated for localized resource allocation and N−M physical resource blocks are allocated for distributed resource allocation, in which each physical resource block comprises U subcarriers and where N and U are each integers greater than one and M is an integer at least equal to one; and permuting the subcarriers of the N physical resource blocks to result in N subchannels. Then, serially for each $m^{th}$ one of the M physical resource blocks allocated for localized resource allocation, the method continues by puncturing from the permuted subchannels the subcarriers for an $m^{th}$ one of the M physical resource blocks allocated for localized resource allocation; and after puncturing, filling subcarriers of one of the subchannels with subcarriers of all other subchannels which were punctured in the $m^{th}$ one of the M physical resource blocks. Continuing this serial puncturing and filling across all of the M physical resource blocks allocated for localized resource allocation results in N−M physical resource blocks each having U subcarriers and M physical resource blocks each having U subcarriers. For this method, furthermore there is a wireless communication using at least one of a localized resource allocation on the resulting M physical resource blocks or a distributed resource allocation on the resulting N−M physical resource blocks.

In accordance with one exemplary aspect of the invention there is a memory storing a computer readable program that when executed by a processor results in actions comprising: determining that M physical resource blocks are allocated for localized resource allocation and N−M physical resource blocks are allocated for distributed resource allocation, in which each physical resource block comprises U subcarriers and where N and U are each integers greater than one and M is an integer at least equal to one; and permuting the subcarriers of the N physical resource blocks to result in N subchannels. The actions continue with, serially for each $m^{th}$ one of the M physical resource blocks allocated for localized resource allocation: puncturing from the permuted subchannels the subcarriers for an $m^{th}$ one of the M physical resource blocks allocated for localized resource allocation; and after puncturing, filling subcarriers of one of the subchannels with subcarriers of all other subchannels which were punctured in the $m^{th}$ one of the M physical resource blocks. The result after all M physical resource blocks are punctured and filled is N−M physical resource blocks each having U subcarriers and M physical resource blocks each having U subcarriers.

In accordance with one exemplary aspect of the invention there is an apparatus comprising a processor and a memory configured to: determine that M physical resource blocks are allocated for localized resource allocation and N−M physical resource blocks are allocated for distributed resource allocation, in which each physical resource block comprises U subcarriers and where N and U are each integers greater than one and M is an integer at least equal to one; and to permute the subcarriers of the N physical resource blocks to result in N subchannels. The processor and memory are further configured, serially for each $m^{th}$ one of the M physical resource blocks allocated for localized resource allocation: to puncture from the permuted subchannels the subcarriers for an $m^{th}$ one of the M physical resource blocks allocated for localized resource allocation; and after puncturing, to fill subcarriers of one of the subchannels with subcarriers of all other subchannels which were punctured in the $m^{th}$ one of the M physical resource blocks. After all M physical resource blocks are punctured and filled, the result is N−M physical resource blocks each having U subcarriers and M physical resource blocks each having U subcarriers.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

Embodiments of this invention provide a subchannelization method which solves the problem of how to do the LRA and DRA flexibly within one or any number of frequency reuse groups, as well as an apparatus and computer program configured to flexibly permute and subchannelize the subcarriers for LRA and DRA. The description below is in terms of a single frequency reuse group but of course these teachings can be extended to multiple such groups by simple iterative repetition of the examples and principles detailed herein. While specific examples are in the context of WiMAX IEEE 802.16m, embodiments of the invention are not limited only to that wireless standard and its descendents but are applicable to any wireless protocol which employs frequency reuse groups for DRA and for some other scheme, like LRA, that is different in kind from DRA.

First some background is presented. In WiMAX or any other wireless standard employing OFDMA as the PHY technique, DRA is intended to utilize frequency diversity to improve link-level performance and to reduce the volume of feedback information for scheduling. LRA is intended to do channel-aware scheduling to improve system throughput or performance. PUSC and FUSC in the 802.16e standard belong to DRA, while AMC in the 802.16e standard belongs to LRA.

The following nomenclature is used in the examples and description below. All letter variables are integers greater than one. The basic PHY RB is a rectangular block of U*W adjacent subcarriers in frequency-time domain, where U is the number of subcarriers per OFDMA symbol and W is the number of OFDMA symbols. These may be indexed respectively as u={1, 2, ... U} and w={1, 2, ... W}. There are N PHY RBs in a specific frequency reuse group, and as above there may be one or (more advantageously) more than one frequency reuse group. The PHY RBs are from the same W OFDMA symbols, i.e. they may be considered as being multiplexed in the frequency domain.

First consider a simple example in which there is 1 PHY RB (call this the K-th RB out of the total number N RBs that span the bandwidth) selected for LRA. This means that the remaining N−1 RBs are selected for DRA. This example is detailed with reference to FIG. 1, and may be considered in two main steps.

Figure 1:
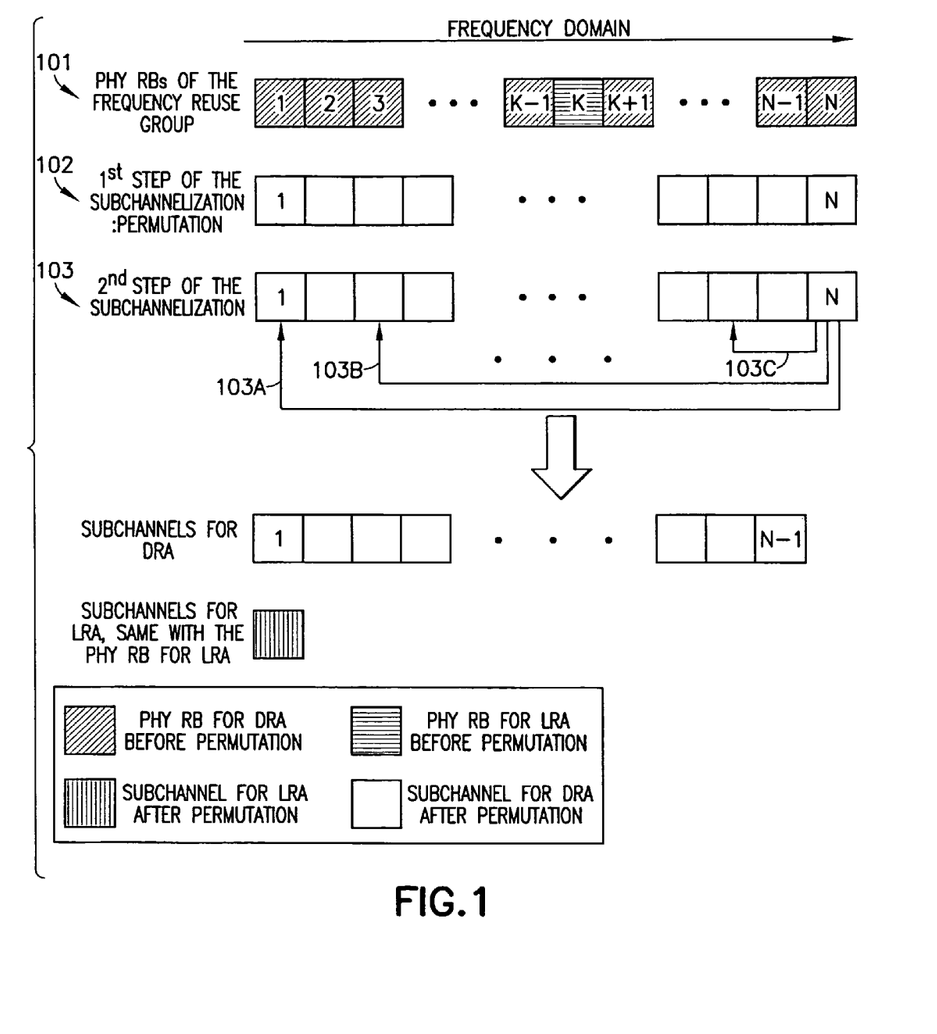
FIG. 1 is a conceptual diagram showing permutation and subchannelization of resource blocks according to an exemplary embodiment of the invention.

First, permutation is done as if there are no PHY RBs used for LRA, and so permutation is among all of the original number N of RBs. The permutation can be done against any original order of the subcarriers of the N RBs, as shown in FIG. 1 as reference number 101, so long as all nodes know the original order. In that regard the original order may even be arbitrary. After the permutation, we get N DRA subchannels, as shown in FIG. 1 at reference number 102. Note that we assume that each DRA subchannel contains the same number of subcarriers as a PHY RB. No RBs are yet removed for LRA, so all of the N subchannels may be considered at his moment to be for DRA. These subcarriers of each subchannel are spread over the whole frequency band of the N PHY RBs. The specific sequence of this permutation may be any permutation method known or yet to be developed, and a particularly advantageous example in that it is seen as quite simple to implement is the permutation procedure detailed at IEEE 802.16e for FUSC permutation, though permutation to comply with 802.16m according to these teachings would have a different number of subcarriers per subchannel and a different number of subchannels as compared to 802.16e. See for example section 8.4.6.1.2.2.2 of IEEE 802.16Rev2/D3, "IEEE draft standard for Local and Metropolitan Area Networks—Part 16: Air interface for fixed Broadband Wireless Access systems", February 2008 (attached as Exhibit D to incorporated U.S. Provisional Patent Application No. 61/123, 723).

Second, the specific PHY RB for LRA are removed from the DRA subchannels. There will then be U subcarriers per OFDMA symbol punctured out from some of the DRA subchannels. [For this example, disregard the possibility that different OFDMA symbols could have a different number of data subcarriers due to pilot insert.] Sequentially, in each OFDMA symbol, take the subcarriers from the last DRA subchannel one-by-one and fill them into the U punctured subcarriers (or U−k "punctured subcarriers" if k subcarriers of the LRA RB happen to fall in the last DRA subchannel) as shown at reference number 103 of FIG. 1 in the sequence 103A, 103B, 103C for example. After this, there will be N−1 DRA subchannels, each of which contains U subcarriers per OFDMA symbol spread over the N−1 PHY RBs selected for DRA.

A more detailed procedure for moving the subcarriers from the last DRA subchannel to fill in the punctured subcarriers of other DRA subchannels is given below as a particular example and embodiment of the invention. The goal is to gain the largest possible frequency diversity without too much complexity. Assume an integer variable j. Set the value of j from 1 to U−k and repeat the following steps:

Take the j-th subcarrier from the last DRA subchannel and denote it as $s_j$. Assume that $s_j$ is from a specific (nth) PHY RB. Assume that there are V DRA subchannels that have punctured subcarriers. Denote each of the V subchannels as $c_v$, v=1, 2, . . . , V. Check how many subcarriers in $c_v$ are also from the same (nth) PHY RB that contains $s_j$, and denote the number as $t_v$.

Find the $1^{st}$ subchannel with the smallest $t_v$ among all the V subchannels. Fill $s_j$ in it.

Note that the LRA subchannel is the same with the PHY RB selected for LRA.

By embodiments of this invention detailed by example above, the advantage of inter-cell/sector interference averaging (similar to 802.16e PUSC/FUSC) is kept. This is because:

In the first step of the subchannelization (reference number 102), the permutation is done using the same basic permutation sequence within the same PHY resources among different cells/sectors. Therefore, each subchannel has a very low "hitting" probability with any subchannel in other cells/sectors, as explained in the background section above.

The hitting probability can be shown quantitatively. Denote the "hitting" probability as p, which could be computed by averaging all possible h/U, where h is the number of "subcarrier hits" between any two subchannels from different cells/sectors. It can be approximated that each subcarrier in a specific subchannel has a p/U "hitting" probability with any subchannel in other cells/sectors. Therefore, in the second step (reference number 103), when we insert one subcarrier of the last subchannel to a specific subchannel, it means approximately that the "hitting" probability of that subchannel is increased by p/U. That is, the resulted "hitting" probability is still low and under control.

For the general case where there are M (>1) PHY RBs allocated for LRA, the second step of the subchannelization process will be iteratively done for M times. After that, there will be N−M DRA subchannels, and M LRA subchannels. The end result is that the LRA subchannels are the same with the PHY RBs selected for LRA; the subcarriers of each DRA subchannel are spread over the whole band of the N−M PHY RBs selected for DRA; and the property of inter-cell/sector interference averaging for DRA subchannels is kept.

Figure 2A:
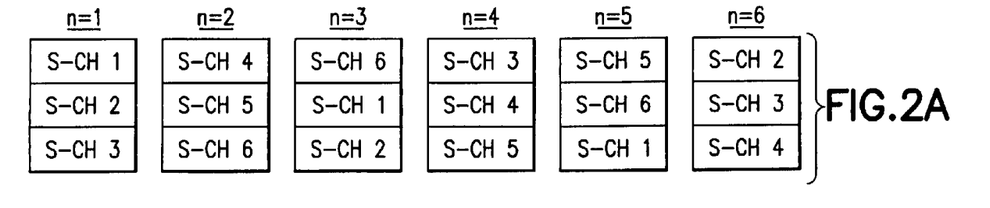
FIGS. 2A-E illustrate steps of a specific permutation and subchannelization example detailed herein according to an exemplary embodiment of the invention.

Following is a second exemplary embodiment of the invention, based on a simple block-wise permutation so as to aid in understanding how to use a method/algorithm according to these teachings. Assume N=6 and U=3. Assume further that the third and fifth PHY RBs are used for LRA. Denote the j-th subcarrier (per OFDMA symbol) in the i-th PHY RB as (i,j), and so i=1, 2, 3, 4, 5, 6; and j=1, 2, 3. This specific example is shown at FIGS. 2A-E, in which the blocks annotated n=1, . . . 6 illustrate the N=6 PHY RBs and each row within a block indicates one of the U=3 subcarriers. Each row further indicates to which sub-channel it belongs. Assume the permutation result from the first step (reference number 102) is as follows, which is illustrated at FIG. 2A:

subchannel 1 contains: (1,1) (3,2) (5,3)
subchannel 2 contains: (1,2) (3,3) (6,1)
subchannel 3 contains: (1,3) (4,1) (6,2)
subchannel 4 contains: (2,1) (4,2) (6,3)
subchannel 5 contains: (2,2) (4,3) (5,1)
subchannel 6 contains: (2,3) (3,1) (5,2)

Figure 2B:
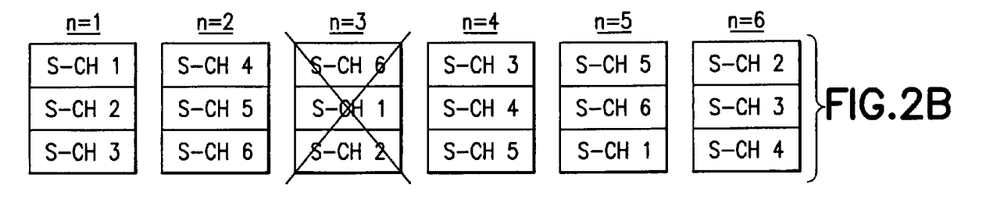

For the second step, take out the third PHY RB as shown at FIG. 2B. Using the notation that a blank entry indicates a punctured subcarrier of the specific subchannel exhibiting the blank entry, taking out that third PHY RB changes the subchannels to:

subchannel 1 contains: (1,1) (5,3)
subchannel 2 contains: (1,2) (6,1)
subchannel 3 contains: (1,3) (4,1) (6,2)
subchannel 4 contains: (2,1) (4,2) (6,3)
subchannel 5 contains: (2,2) (4,3) (5,1)
subchannel 6 contains: (2,3) (5,2).

Figure 2C:
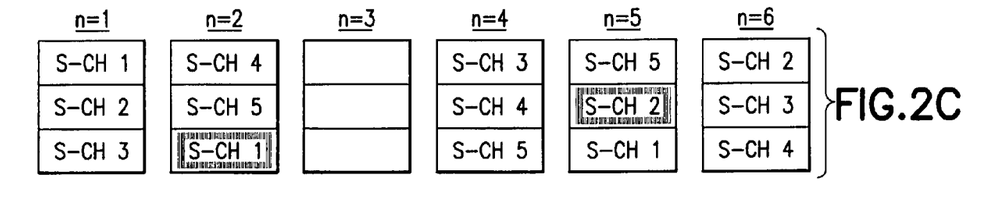

One can readily see that DRA subchannels 1, 2 and 6 are punctured. We need only concern ourselves for this example with subchannels 1 and 2, which will always be the case when the last subchannel is punctured because in that case the last subchannel will be 'emptied' by the sequential filling using its non-punctured subcarriers and will never need to be filled (given the assumptions above for equal numbers of subcarriers in each RB). Now, take the subcarriers from the last subchannel to fill in the punctured subcarriers one-by-one sequentially. There are two subchannels of concern having punctured subcarriers: subchannel 1 and 2. Take the first subcarrier (2,3) from subchannel 6, which is obviously from the second PHY RB. We could easily confirm that in both subchannels 1 and 2 there are no subcarriers from the second PHY RB. Therefore, the first subcarrier (2,3) of subchannel 6 is inserted to the punctured position of subchannel 1 as shown by shading at FIG. 2C. After that, the next (third position) subcarrier (5,2) of subchannel 6 is inserted to the punctured position of subchannel 2, also shown by shading at FIG. 2C. The end result is then five DRA subchannels, with subcarriers illustrated at FIG. 2C and as follows (where bold indicates a subcarrier filled into a formerly punctured position):

subchannel 1 contains: (1,1) (2,3) (5,3)
subchannel 2 contains: (1,2) (5,2) (6,1)
subchannel 3 contains: (1,3) (4,1) (6,2)
subchannel 4 contains: (2,1) (4,2) (6,3)
subchannel 5 contains: (2,2) (4,3) (5,1)

Figure 2D:
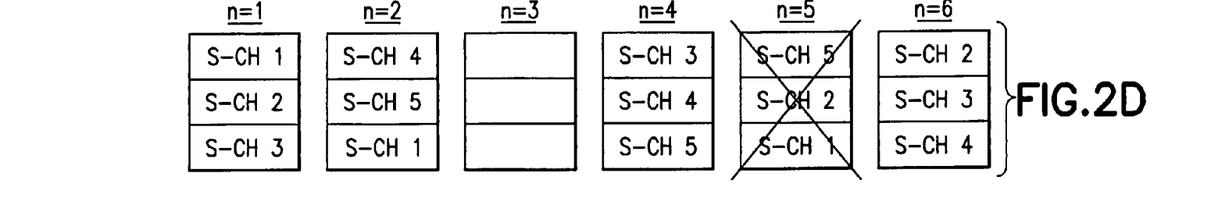

Next the process repeats itself for any other LRA RBs, one by one. Since in this example there is another RB for LRA, then call this a third step, in which the fifth PHY RB is taken out as shown at FIG. 2D. Using the same nomenclature as above, the subchannels then are changed to:

subchannel 1 contains: (1,1) (2,3)
subchannel 2 contains: (1,2) (6,1)
subchannel 3 contains: (1,3) (4,1) (6,2)
subchannel 4 contains: (2,1) (4,2) (6,3)
subchannel 5 contains: (2,2) (4,3)

Figure 2E:
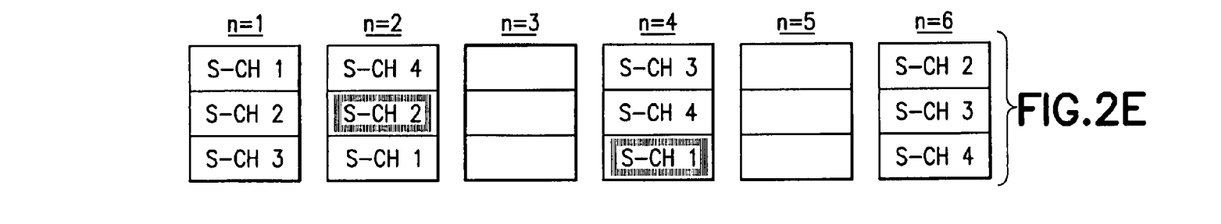

Now take the subcarriers from the last subchannel to fill in the punctured subcarriers one-by-one sequentially. There are again two subchannels of interest having punctured subcarriers: subchannel 1 and 2. Take the first subcarrier (2,2) from subchannel 5 [obviously 'first' in this instance means the first non-punctured subcarrier], which is from the second PHY RB. One could readily see from the above listing that subchannel 1 has a subcarrier from the second PHY group and subchannel 2 doesn't have one from the second PHY RB. Therefore, subcarrier (2,2) is inserted to subchannel 2 as shown by shading at FIG. 2E. Subsequently, subcarrier (4,3) is inserted to subchannel 1, also shown by shading at FIG. 2E. The end result for this example is four DRA subchannels illustrated at FIG. 2E and as follows:

subchannel 1 contains: (1,1) (2,3) (4,3)
subchannel 2 contains: (1,2) (2,2) (6,1)
subchannel 3 contains: (1,3) (4,1) (6,2)
subchannel 4 contains: (2,1) (4,2) (6,3)

Certain embodiments of the present invention offer certain advantages which may be briefly summarized as follows. A novel subchannelization method is proposed to flexibly do LRA and DRA within one frequency reuse group. Regardless of how many and which PHY RBs are chosen for LRA, in these embodiments:

The same permutation sequence and the same permutation/subchannelization procedure will be used, which simplifies the implementation complexity.

The advantage of inter-cell interference averaging is sustained, the same as 802.16e PUSC and FUSC.

Full frequency diversity is kept among all the available bandwidth, i.e. the subcarriers of each DRA subchannel are spread over the whole band of the PHY RBs selected for DRA.

Figure 3:
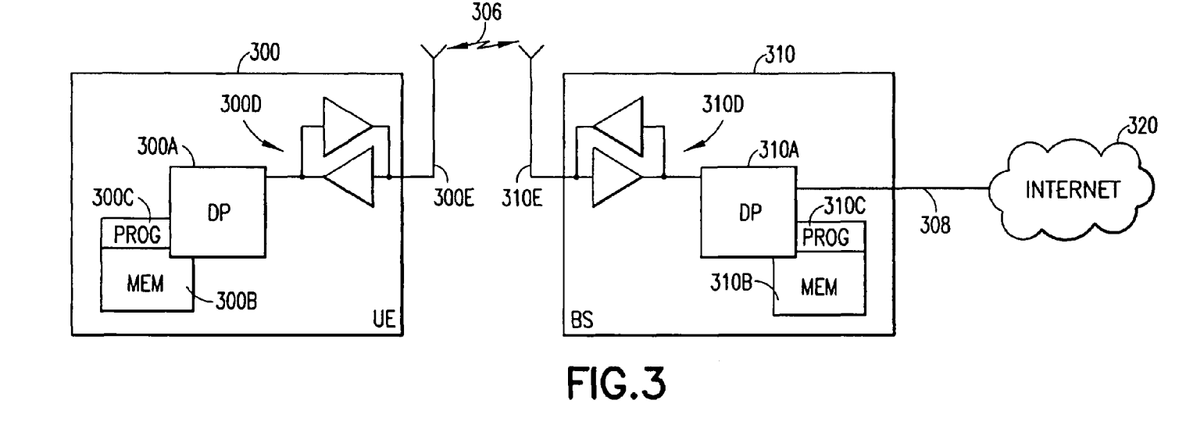
FIG. 3 shows a simplified block diagram of various electronic devices that are suitable for use in practicing the exemplary embodiments of this invention.

Reference is now made to FIG. 3 for illustrating a simplified block diagram of various electronic devices that are suitable for use in practicing the exemplary embodiments of this invention. In FIG. 3 a wireless network is adapted for communication between a UE 300 and an access node 310 (base station). The network may include a gateway GW/serving mobility entity MME/radio network controller RNC or other radio controller function (not shown) known by various terms in different wireless communication systems. The UE 300 includes a data processor (DP) 300A, a memory (MEM) 300B that stores a program (PROG) 300C, and a suitable radio frequency (RF) transceiver 300D coupled to one or more antennas 300E (one shown) for bidirectional wireless communications over one or more wireless links 306 with the BS 310.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The BS 310 also includes a DP 310A, a MEM 310B, that stores a PROG 310C, and a suitable RF transceiver 310D coupled to one or more antennas 310E. The BS 310 may be coupled via a data path 308 (wired or wireless) to the Internet or other broader network, which may be via a serving or other GW/MME/RNC. If present, the GW/MME/RNC also includes a DP, a MEM that stores a PROG, and a suitable modem and/or transceiver (not shown) for communication with the BS 310 over the data link 308.

At least one of the PROGs 300C and 310C is assumed to include program instructions that, when executed by the associated DP, enable the electronic device to operate in accordance with the exemplary embodiments of this invention, as detailed above. Inherent in the DPs 300A and 310A is a clock to enable synchronism among the various apparatus for transmissions and receptions within the appropriate time intervals and slots required.

The PROGs 300C and 310C may be embodied in software, firmware and/or hardware, as is appropriate. In general, the exemplary embodiments of this invention may be implemented by computer software stored in the MEM 300B and executable by the DP 300A of the UE 300 and similar for the other MEM 310B and DP 310A of the BS 310, or by hardware, or by a combination of software and/or firmware and hardware in any or all of the devices shown.

In general, the various embodiments of the UE 300 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 300B and 310B may be of any type suitable to the local technical environment and may be implemented using any suitable data storage technology, such as semiconductor-based memory devices, magnetic memory devices and systems, optical memory devices and systems, fixed memory and removable memory. The DPs 300A and 310A may be of any type suitable to the local technical environment, and may include one or more of general purpose computers, special purpose computers, microprocessors, digital signal processors (DSPs) and processors based on a multi-core processor architecture, as non-limiting examples.

Figure 4:
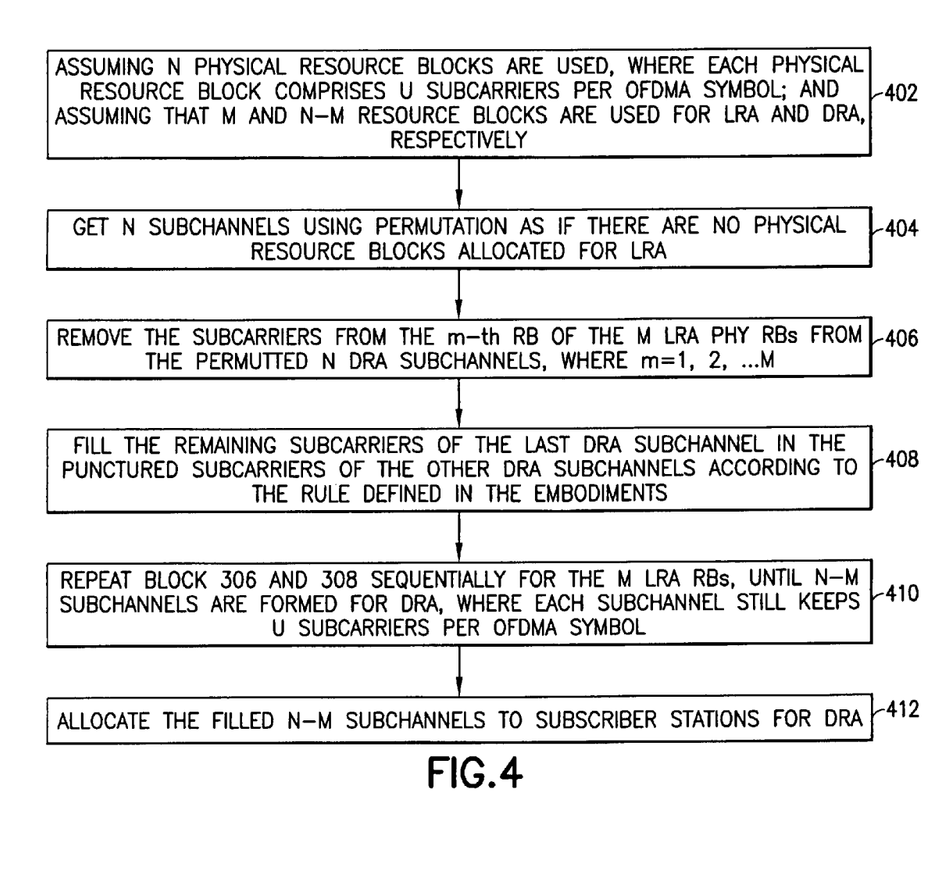
FIG. 4 is a process flow diagram according to an exemplary embodiment of the invention.

From the above description and with reference to FIG. 4 it is apparent that embodiments of this invention include an apparatus such as a portable user equipment or a base station, a computer program embodied on a memory that may be disposed in the user equipment or base station, and a method by which the user equipment or base station set at block 402 a number N of physical resource blocks (where each physical resource block comprises U subcarriers). In the N physical RBs, assume M PHY RBs and N−M RBs are allocated for LRA and DRA, respectively (e.g., the BS determines that M of the N physical RBs will be for LRA and the remaining N−M physical RBs will be for DRA). Get N subchannels at block 404 using permutation as if there are no physical RBs allocated for LRA. As above, the permutation procedure can be referred to at section 8.4.6.1.2.2.2 of IEEE 802.16Rev2/D3, "IEEE draft standard for Local and Metropolitan Area Networks—Part 16: Air interface for fixed Broadband Wireless Access systems", February 2008. Remove the subcarriers of the m-th RB (of the M LRA PHY RBs, m=1, 2, . . . M) from the permuted N DRA subchannels at block 406. Fill the remaining subcarriers of the last DRA subchannel in the punctured subcarriers of the other DRA subchannels according to the rule defined in the embodiments at block 408. Repeat blocks 406 and 408 at block 410 sequentially for all the M LRA RBs, until N−M subchannels are formed for DRA, where each subchannel still keeps U subcarriers per OFDMA symbol. As above, the values N and U are integers greater than one and the value M is an integer at least equal to one. For the case where M is greater than one, blocks 406, 408 and 410 are repeated for each subsequent m-th one of the M LRA physical RBs. At block 412 the BS stores the filled N−M subchannels for DRA in its memory and allocates to its subscriber stations the filled N−M subchannels (RBs) for DRA (and allocates the M physical RBs also to the subscriber stations for LRA), such as over the wireless link 306 of FIG. 3. The BS may initially determine a partition of physical resources into RBs for DRA and RBs for LRA and execute the above algorithm on the determined DRA RBs individually. The BS may then signal to the subscriber stations/UEs such as over the wireless link 306 of FIG. 3 which RBs are allocated for LRA, and both the BS and the individual subscriber stations figure the remaining RBs for DRA from the signaled RBs for LRA and then determine the permutation and subchannelization from the algorithm which they each execute.

In one particular embodiment detailed above, the algorithm operates to move the subcarriers by, for each jth subcarrier (j=1, 2, . . . U−k), take the j-th subcarrier from the last DRA subchannel and denote it as $s_j$ (from a specific [nth] PHY RB). Assume that there are V DRA subchannels that have punctured subcarriers. Denote each of the V subchannels as $c_v$, v=1, 2, . . . , V. Check how many subcarriers in $c_v$ are from the same (nth) PHY RB that contains $s_j$, denoted as the number $t_v$. Find the first subchannel with the smallest $t_v$ among all the V subchannels, and fill $s_j$ in it.

For the aspects of this invention, it should be noted that the various logical step descriptions above and in FIG. 4 may represent program steps, or interconnected logic circuits of an integrated circuit, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:
1. A method comprising:
    determining that M physical resource blocks are allocated for localized resource allocation and N minus M physical resource blocks are allocated for distributed resource allocation, in which each physical resource block comprises U subcarriers and where N and U are each integers greater than one and M is an integer at least equal to one;

permuting the subcarriers of the N physical resource blocks to result in N subchannels;

serially for each $m^{th}$ one of the M physical resource blocks allocated for localized resource allocation:

puncturing from the permuted subchannels the subcarriers for an $m^{th}$ one of the M physical resource blocks allocated for localized resource allocation;

after puncturing, filling subcarriers of one of the subchannels with subcarriers of all other subchannels which were punctured in the $m^{th}$ one of the M physical resource blocks, so as to result, after all M physical resource blocks are punctured and filled, in N minus M physical resource blocks each having U subcarriers and M physical resource blocks each having U subcarriers; and communicating wirelessly using at least one of:
localized resource allocation on the resulting M physical resource blocks, and
distributed resource allocation on the resulting N minus M physical resource blocks.

2. The method according to claim 1, wherein each physical resource block comprises U subcarriers on each of W orthogonal frequency division multiplex symbols, and where after the filling each subchannel comprises an equal number U of subcarriers per symbol.

3. The method according to claim 1, wherein M is an integer greater than one.

4. The method according to claim 1, executed by a network node and further comprising:
storing the filled resulting N minus M physical resource blocks in a localized memory of the network node and allocating to subscriber stations the filled resulting N minus M physical resource blocks for distributed resource allocation.

5. The method according to claim 4, further comprising, prior to the said communicating wirelessly, signaling to the subscriber stations an indication of the value of M, an indication of the value of N, and an indication of which physical resource blocks are allocated for localized resource allocation.

6. The method according to claim 1, executed by a subscriber station, and wherein the determining is from at least one message received from a network node that indicates values for M and N and which physical resource blocks are allocated for localized resource allocation.

7. The method according to claim 6, further comprising the subscriber station determining, from the indication of which physical resource blocks are allocated for localized resource allocation, remaining physical resource blocks that are allocated for distributed resource allocation, and thereafter executing the permuting, puncturing and filling.

8. The method according to claim 1, wherein filling the subcarriers comprises, for integer index j which varies from 1, ... U–k:
denoting a $j^{th}$ subcarrier from a last subchannel allocated for distributed resource allocation as $s_j$, which is assumed to be from an $n^{th}$ physical resource block;
denoting as $c_v$, where v=1, 2, ..., V, each of V subchannels which have a subcarrier punctured;
checking how many subcarriers in $c_v$ are also from the same $n^{th}$ physical resource block that contains $s_j$, and denote the number as $t_v$; and
finding the subchannel with the smallest $t_v$ among all the V subchannels and filling $s_j$ into the found subchannel.

9. A memory storing a computer readable program that when executed by a processor results in actions comprising:
determining that M physical resource blocks are allocated for localized resource allocation and N minus M physical resource blocks are allocated for distributed resource allocation, in which each physical resource block comprises U subcarriers and where N and U are each integers greater than one and M is an integer at least equal to one;
permuting the subcarriers of the N physical resource blocks to result in N subchannels;
serially for each $m^{th}$ one of the M physical resource blocks allocated for localized resource allocation:
puncturing from the permuted subchannels the subcarriers for an $m^{th}$ one of the M physical resource blocks allocated for localized resource allocation; and
after puncturing, filling subcarriers of one of the subchannels with subcarriers of all other subchannels which were punctured in the $m^{th}$ one of the M physical resource blocks, so as to result, after all M physical resource blocks are punctured and filled, in N minus M physical resource blocks each having U subcarriers and M physical resource blocks each having U subcarriers.

10. The memory according to claim 9, wherein each physical resource block comprises U subcarriers on each of W orthogonal frequency division multiplex symbols, and where after the filling each subchannel comprises an equal number U of subcarriers per symbol.

11. The memory according to claim 9, wherein M is an integer greater than one.

12. The memory according to claim 9, further comprising signaling to subscriber stations an indication of the value of M, an indication of the value of N, and an indication of which physical resource blocks are allocated for localized resource allocation.

13. The memory according to claim 9, wherein the determining is from at least one message received from a network node that indicates values for M and N and which physical resource blocks are allocated for localized resource allocation, the actions further comprising:
determining, from the indication of which physical resource blocks are allocated for localized resource allocation, remaining physical resource blocks that are allocated for distributed resource allocation, and thereafter executing the permuting, puncturing and filling.

14. An apparatus comprising a processor and a memory configured to:
determine that M physical resource blocks are allocated for localized resource allocation and N minus M physical resource blocks are allocated for distributed resource allocation, in which each physical resource block comprises U subcarriers and where N and U are each integers greater than one and M is an integer at least equal to one;
permute the subcarriers of the N physical resource blocks to result in N subchannels;
serially for each $m^{th}$ one of the M physical resource blocks allocated for localized resource allocation:
puncture from the permuted subchannels the subcarriers for an $m^{th}$ one of the M physical resource blocks allocated for localized resource allocation; and
after puncturing, filling subcarriers of one of the subchannels with subcarriers of all other subchannels which were punctured in the $m^{th}$ one of the M physical resource blocks, so as to result, after all M physical resource blocks are punctured and filled, in N minus M physical resource blocks each having U subcarriers and M physical resource blocks each having U subcarriers.

15. The apparatus according to claim 14, wherein each physical resource block comprises U subcarriers on each of W orthogonal frequency division multiplex symbols, and where after the filling each subchannel comprises an equal number U of subcarriers per symbol.

16. The apparatus according to claim 14, wherein M is an integer greater than one.

17. The apparatus according to claim 14, wherein the apparatus comprises a network node which further comprises:
- a localized memory storing the filled resulting N minus M physical resource blocks; and
- a transmitter configured to allocate to subscriber stations the filled resulting N minus M physical resource blocks for distributed resource allocation.

18. The apparatus according to claim 17, in which the transmitter is configured to signal to the subscriber stations an indication of the value of M, an indication of the value of N, and an indication of which physical resource blocks are allocated for localized resource allocation.

19. The apparatus according to claim 14, wherein the apparatus comprises a subscriber station, and wherein the processor is configured to determine that M physical resource blocks are allocated for localized resource allocation and that N minus M physical resource blocks are allocated for distributed resource allocation from at least one message received from a network node that indicates values for M and N and which physical resource blocks are allocated for localized resource allocation.

20. The apparatus according to claim 19, wherein the processor is configured to further determine, from the indication of which physical resource blocks are allocated for localized resource allocation, remaining physical resource blocks that are allocated for distributed resource allocation, and thereafter to permute, puncture and fill.

* * * * *